Jan. 19, 1932.     D. M. FREEMAN     1,841,369
EDUCATIONAL AND AMUSEMENT DEVICE
Filed Nov. 24, 1928
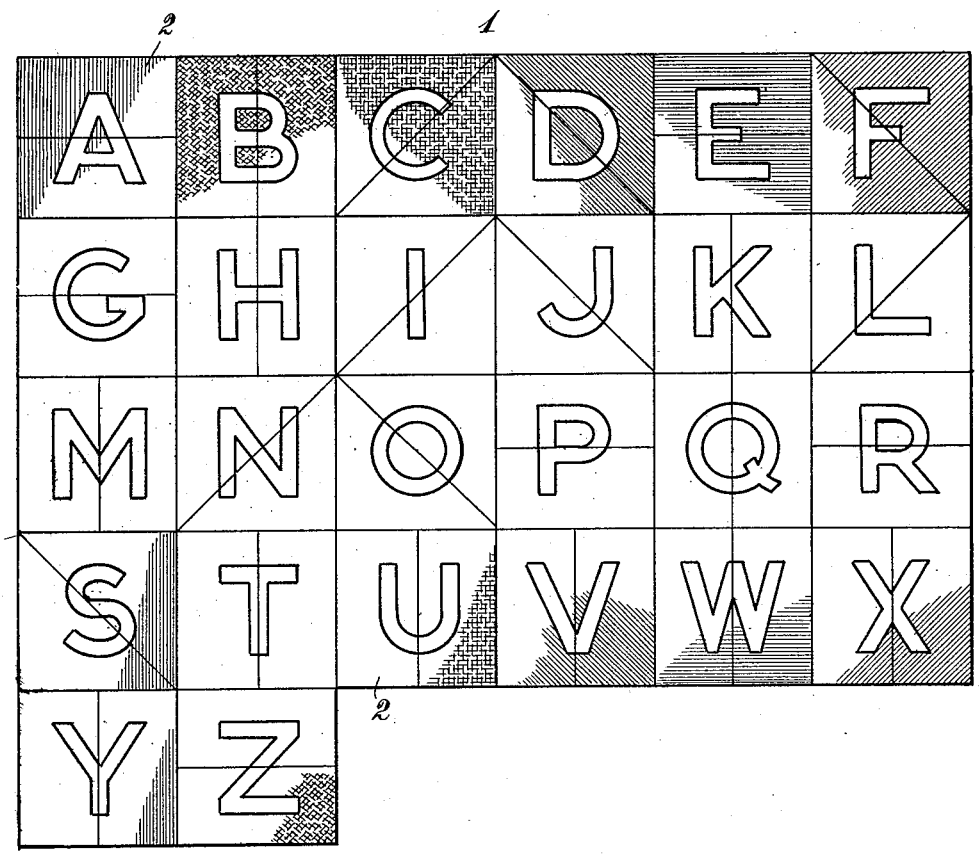

Patented Jan. 19, 1932

1,841,369

UNITED STATES PATENT OFFICE

DEANE M. FREEMAN, OF BROOKLINE, MASSACHUSETTS

EDUCATIONAL AND AMUSEMENT DEVICE

Application filed November 24, 1928. Serial No. 321,684.

The invention relates to an educational and amusement device for young children especially for use in connection with kindergarten work, and the object is to provide a device with which the child can play and which at the same time will assist in teaching him the alphabet and the difference between colors.

The device comprises a number of elements or parts to be assembled, and the drawing shows a plan of the device when all its elements or parts are properly assembled or combined.

Referring to the drawing:—

The assembled device 1 is made up of a plurality of individual elements 2 capable of being assembled. The elements are of any suitable composition such as wood or cardboard and are preferably rectangular in form. Each of the elements bears upon it a letter of the alphabet, and each bears also a particular color or shade of color which is like that appearing on certain other of the elements bearing a different letter. I prefer to employ a considerable number of colors in the coloring of the elements in order that there may be obtained several determinate bands of color when all the elements are assembled or combined. I prefer also that the colors used or at least some of them be somewhat alike so that a certain amount of color sense will be necessary in order to properly distinguish them. For example, I have indicated in the drawing the use of the colors red, orange and yellow and also of the colors green, blue and purple.

I prefer also that each element shall consist of separate parts, the cutting being such that certain of the elements will consist of two parts made by either horizontal or vertical cuttings, and others of the elements shall consist of two triangular parts made by diagonal cuttings; also that each of the parts of each element shall bear a sectional part of the letter borne by said element.

The correlation between the letters appearing on the various elements and the colors appearing upon the same elements are such that when all the elements or parts of elements are so assembled that the letters thereon will form the alphabet with the letters in immediate consecutive order, then the various colors on said elements will form determinate bands of color lying in separate and preferably parallel lines with all the elements bearing the same color lying in the same band, and the letters borne by the successive elements occurring in any band of color not lying in immediate consecutive order. For example,—in the drawing where the elements are shown so assembled that the letters thereon will form the alphabet with the letters in immediate consecutive order, the elements bearing the letters A, G, M, S and Y, being letters not in immediate consecutive order, and which elements are all the elements bearing the color red, will appear in the assemblage as a band of color. In the same manner the elements bearing the letters C, I, O and U, being letters not in immediate consecutive order, and which elements are all the elements bearing the color yellow, will appear in the assemblage as a band of color.

Inasmuch as the elements may be so assembled that separate and determinate bands of color may be formed when the letters thereon are not in immediate consecutive order to form the alphabet and even individual letters themselves not properly formed, where the elements are in separate parts, the child will very likely in arranging the elements first learn to arrange them so as to form the proper bands of color, and afterward learn to arrange them so as to form the alphabet with the letters lying in immediate consecutive order.

Having thus fully described my invention, I claim and desire to secure by Letters Patent of the United States:—

An educational and amusement device comprising a plurality of individual elements capable of being assembled, each of said elements bearing a letter of the alphabet and each of said elements bearing, also, a color like the color borne by certain other of said elements whereby the letters may be arranged in alphabetical order with the colors of the blocks forming successive parallel bands and the letters borne by the successive elements occurring in any band of color not lying in immediate consecutive alphabetical order.

DEANE M. FREEMAN.